Patented July 21, 1953

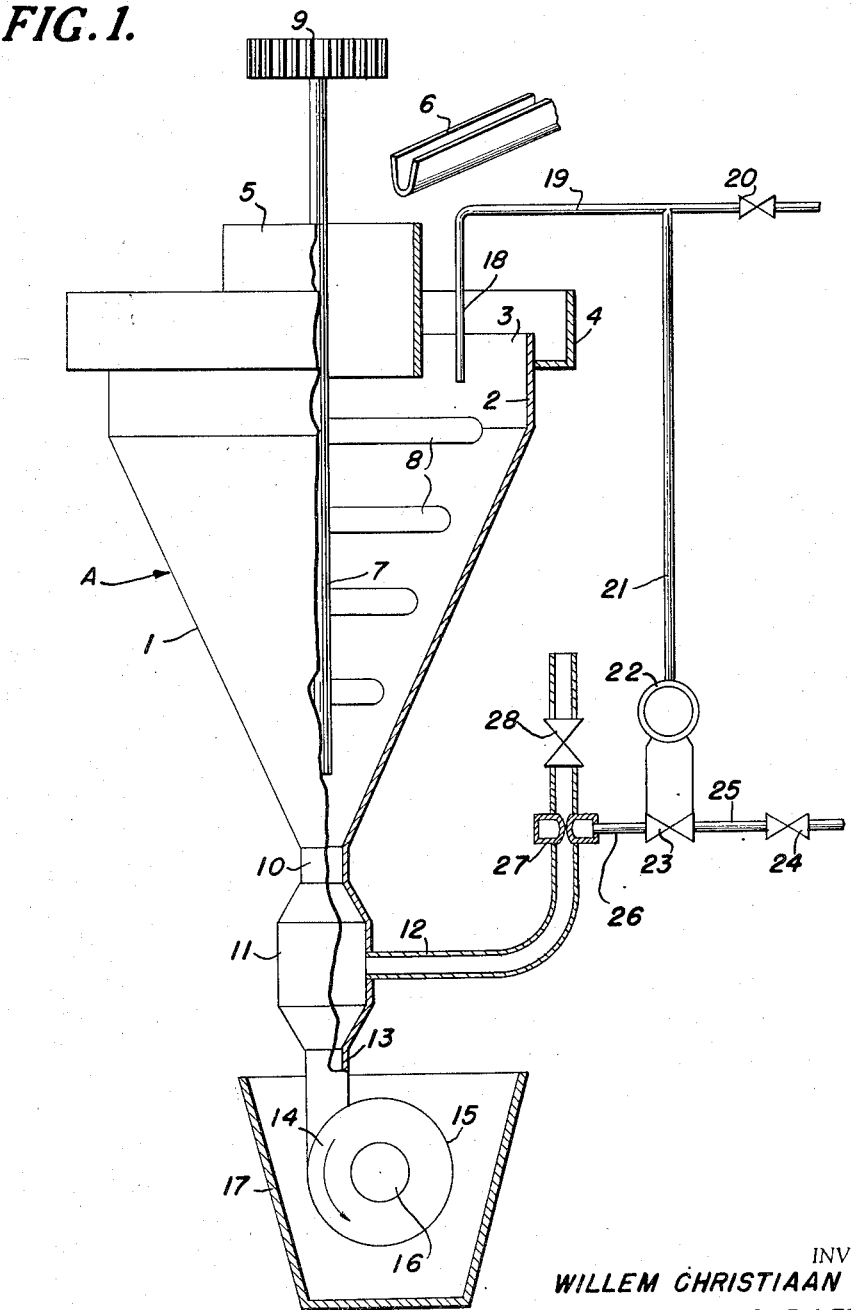

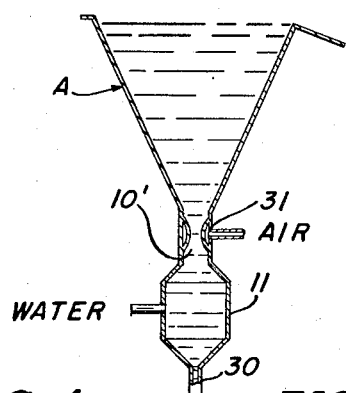
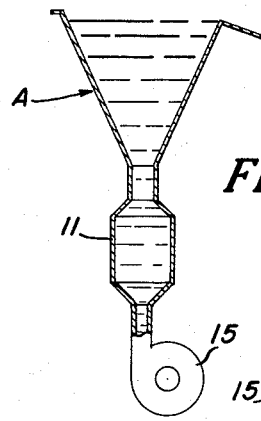
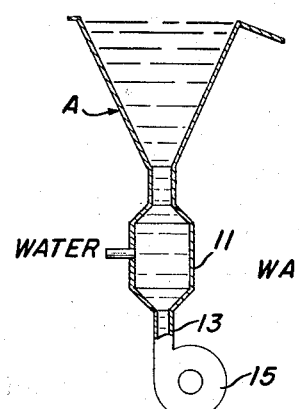
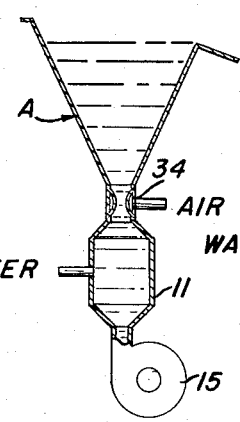
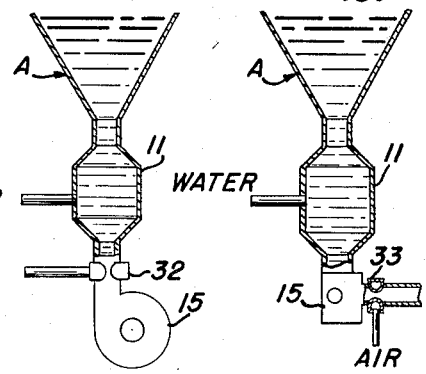
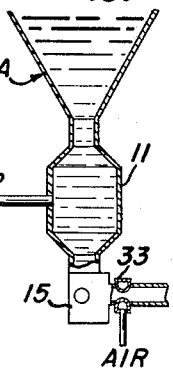
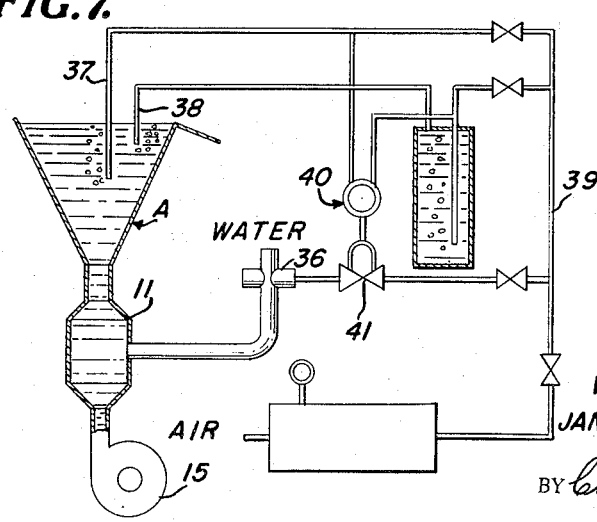
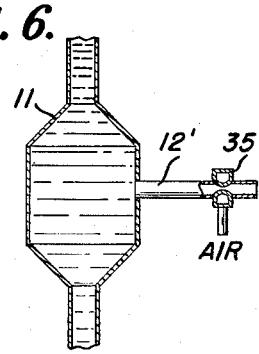

2,646,169

UNITED STATES PATENT OFFICE 2,646,169

PROCESS AND APPARATUS FOR THE SEPARATION OF MATERIALS OF DIFFERENT SPECIFIC GRAVITY AND SIZES

Willem C. Fox, Brunssum, and Jan N. J. Leeman, Hoensbroek, Netherlands, assignors to Stamicarbon N. V., Heerlen, Netherlands Application October 11, 1948, Serial No. 53,938
In Great Britain October 11, 1947

8 Claims. (Cl. 209—173)

This invention relates to a method and apparatus for the separation of materials of different specific gravity and different sizes, and more particularly, this invention relates especially to a method and apparatus wherein conical vessels are generally used which contain a liquid of a certain specific gravity.

To obtain the desired specific gravity, fine solid particles are mixed with a liquid e. g. water.

As fine solid particles, different kinds of materials are used, such as sand, shale particles, magnetite, barytes etc. These particles may be furnished by the materials to be separated or added as a separate suspension.

The known apparatus for carrying out this separating process are provided with water inlet tubes at different levels through which water is injected into the liquid body, so as to establish upward currents which keep the solid particles in suspension. Moreover a stirring organism is provided to prevent the specific gravity differing in certain areas from that in other areas at the same level.

The material to be separated is fed into the vessel at the topside and is separated in the upper zone of the liquid in the vessel, hereinafter called the separation zone. The relatively light materials float on the surface of the liquid whereas the relatively heavy particles settle.

The light floating particles are discharged over a weir and the particles which settle are discharged through an opening at the apex of the vessel.

In carrying out this separating process, one of the difficulties which must be met, is to keep the specific gravity in the separation zone constant, which specific gravity substantially is determined by the concentration of the suspension-particles which are kept in teeter in that zone.

As the amount of suspension-particles fed in and their size distribution seldom will be constant over a considerable time, changes in the upper zone can be expected as to the kind of particles kept in teeter at a predetermined level and hence to the density of the zone. Such changes will be greater when the suspension-particles cover a range of specific gravities and the distribution of the particles over this range appears to be variable.

One of the other causes of the irregularity of the specific gravity is the fact, that the heavy materials, when discharged at the apex end of the vessel, always take with them a certain part of the suspension particles. Therefore special attention must be paid to this discharge.

Therefore, an object of our invention is to improve the means of discharging from a separator, so as to maintain the specific gravity in the separation zone as close as possible to a desired specific gravity of separation.

Another object of the present invention is to make the control of the specific gravity in the separation zone automatic.

A still further object of the present invention is to prevent the discharge openings from being blocked or reduced by the sink materials flowing therethrough.

These and other objects of the invention will appear in the specification, claims, and drawings in which:

Figure 1 is a side elevational fragmentary view of an apparatus of one form of the invention, Figures 2 through 9 inclusive represent schematic views of modifications of the present invention.

According to the invention, the velocity of the stream of liquid directed into a separator through the apex discharge thereof is adjusted in dependency of the specific gravity of the suspension in the separation zone.

We prefer to discharge the sink material through the apex aperture of the separator into a discharge chamber in counter current with the stream of liquid. The stream of liquid is directed into the discharge chamber and a portion of it will flow through the apex aperture in the separator while another portion of it will flow out of the discharge chamber with the sink materials. The velocity of the stream of liquid directed from the discharge chamber into the separator through the apex aperture thereof, can be adjusted in different ways. From a general point of view, it is only necessary to vary the surplus liquid entering the discharge chamber in dependency of the specific gravity of the separation zone. This can be done by varying either the inlet or the outlet of the discharge chamber, or by varying both of them. However, it is preferable not to alter the outlet of the discharge chamber, as the sink material has to be discharged therethrough and a wide and smooth discharge is of particular importance in preventing the outlet from being blocked or reduced. Another means of controlling the surplus liquid in the discharge chamber is by adjusting the stream of liquid directed into the discharge chamber.

Referring now to the drawings wherein like characters and reference numerals represent like or similar parts, one form of the invention is disclosed in Figure 1 wherein the separation zone in the separator is controlled by means for adjusting the stream of current directed into the separator cone through the apex aperture thereof.

The separator comprises a tank A having a lower conical part 1, an upper segmental part 2, an overflow weir 3 and a launder 4. The materials to be separated, containing a fine suspension of particles, are fed by a chute 6 into the cylindrical chute portion 5 extending downwardly into the separator tank A below its rim.

An upward current throughout the separator is established by injecting fluid through numerous nozzles (not shown) situated on different levels in the tapering sides of the separator cone.

In the upper part of the separator, a fluidized or separation zone is established. The apparatus is provided with a mechanical agitator consisting of a rotatable shaft 7 on which is mounted the agitator blades 8. The agitator may be rotated by means of a gear 9 or the like. Sink materials settle through the apex aperture 10 into the discharge chamber of a discharge tank 11. From the discharge chamber of discharge tank 11, the sink materials flow through an outlet 13 tangentially into a discharge device 15 from which they are discharged axially through an annular discharge aperture 16. The discharge device 15, which is sometimes called a cyclonic discharge apparatus, is described and claimed in detail in the copending application of Freerk J. Fontein, Serial No. 702,308, filed October 9, 1946.

A water supply pipe 12, provided with an inlet valve 28 and an iris valve 27, is connected to the discharge chamber of discharge tank 11. The diameter of iris valve 27 is adjusted by means of air pressure regulated by the control mechanism 22 and the air pressure reducing valve 23. The air is admitted by valve 24 and pipe 25 to the valve 23 and from this valve to the iris valve 27 by the pipe 26.

A dip pipe 18 is placed in the separation zone of the tank A. Air pressure is admitted to the dip pipe by valve 20 and pipe 19. Since the level of the suspension fluid in the separator will always be constant, the pressure of the air in the dip pipe will thus depend on the specific gravity of the suspension in the separation zone. This air pressure is directed through the pipe 21 to control mechanism 22, which in turn operates the air pressure reducing valve 23. Hence, the diameter of the iris valve will be controlled by the specific gravity of the suspension in the separation zone and thus the liquid supply to the discharge chamber through pipe 12 is controlled.

By allowing more liquid to enter the discharge chamber through the pipe 12 than is flowing out of the discharge device 15, an upward current is established in the apex aperture 10 of the separator. This upward current can be adjusted in dependency of the specific gravity of the suspension in the separation zone, and thus the specific gravity of the separation zone can be kept at a constant value.

The discharge device 15 described and claimed in copending application Serial No. 702,308, filed October 9, 1946, will assist the control apparatus by counteracting changes in the average specific gravity of the entire separator. This will be described in more detail in reference to the modification shown in Figures 3 and 3A.

Other ways of changing the stream of liquid flowing through the apex aperture of the separation vessel are part of the present invention. So according to another embodiment of the invention as shown in Figure 2, the separator A is provided with a discharge tank 11 having an inlet for water which is fed at a constant rate. The chamber of the discharge tank 11 has an outlet 30 of constant diameter while its inlet 10' which is connected to the separator A is provided with an always open valve 31 having a diameter which can be continuously changed. The valve 31 may be of the flexible iris type and may be controlled by air pressure which in turn is controlled by the variation of the specific gravity in the separation zone.

By keeping the quantity of liquid fed into the discharge chamber constant while maintaining the diameter of the outlet or discharge opening 30 also constant and by varying the diameter of the discharge opening of the separator, the strength of the upward current through the apex opening to the separator can be varied. The diameter of the opening between the separator and the discharge chamber can be much larger than in the case where the separator discharges into free air because of the upward current established therein. Therefore, the chance of this opening being blocked or reduced is lessened. It is also evident that the diameter of the outlet of discharge opening 30 of the discharge chamber can be larger and thus it will not be blocked by the sink material flowing therethrough.

In another form of the invention as disclosed in Figures 3 and 3A, the stream of liquid and sink material is made to flow from the discharge chamber tangentially into a circular path from which is it discharged axially and thereby creating an outflow resistance. As previously stated in connection with Figure 1, a discharge device 15, which is sometimes called a cyclonic discharge apparatus, may be connected to the discharge tank 11 to control the rate of flow of the fluids from the separator. The aforementioned Fontein application 702,308, filed October 9, 1946, discloses a cyclonic discharge apparatus wherein the great advantage lies in the fact that the discharge of liquid is through an opening with a diameter which is a multiple of the diameter of a normal discharge opening of a separator. The discharge device 15 consists of a substantially cylindrical or conical tank having a tangential inlet and at least one axial outlet.

The advantage of providing a cyclonic discharge apparatus to a separator is that the diameter of the inlet and outlet openings is a multiple of a normal outlet opening which discharges the same amount of liquid. In other words, if a normal conical separation vessel is provided with an outlet opening at the apex, the diameter of this opening would be for example ⅓ or ⅔ of the diameter of the inlet and outlet openings of the cyclonic discharge apparatus in order that the same quantity of liquid may be discharged under the same conditions.

Thus it will be obvious that there is practically little or no chance of blocking the openings of the cyclonic discharge device 15 attached to the separator A.

The effect of this discharge apparatus is that the amount of liquid discharged is more or less proportional to the viscosity of the liquid. In other words, in the event that the specific gravity of this liquid is high, i. e., when the liquid contains a relatively great amount of suspension particles, the viscosity will be relatively high with the result that the cyclonic discharge device 15 will discharge a relatively great amount of liquid. This means that more suspension particles will leave the separator A so that the specific gravity in the separator will decrease with the result that the viscosity also becomes lower. When the viscosity becomes lower, less suspension particles will be discharged which results in an increase of specific gravity in the separator and an increase of viscosity.

It is now obvious that the modifications shown in Figures 3 and 3A will control the average specific gravity in the separator A and this control will be completely automatic within a certain range and thus will be of considerable assistance in adjusting the specific gravity in the separation zone.

In varying the amount of liquid fed into the discharge chamber, the strength of the upward current in the discharge opening of the separator will vary, which effect is superimposed to the aforesaid effect of the cyclonic discharge apparatus. As shown in Figure 4, the discharge device 15 is connected to the discharge opening 13 of the discharge tank 11 so that the effect of the discharge device 15 can be superimposed to the effect of varying the water fed into the discharge chamber of the discharge tank 11. If the specific gravity in the separation zone of the separator A is too low the amount of liquid is increased and this results in an increased upward current in the apex opening with the effect that a smaller amount of suspension particles will be discharged. The liquid in the discharge chamber of the discharge tank 11 will have a lower specific gravity and thus the liquid discharged through the cyclonic apparatus 15 will have a lower viscosity. By decreasing the viscosity of the liquid entering the discharge device 15, the discharge from the cyclonic discharge apparatus 15 will be lowered and thus increase the effect of the upward current through the apex opening of the separator A. It is now quite evident that the effect of the discharge device 15 plus the effect of changing the quantity of water entering the discharge chamber of the discharge tank 11 will be superimposed to strengthen the upward stream through the apex opening of separator A.

As soon as the specific gravity in the separator has reached a desired value, the amount of liquid fed into the discharge chamber will be lower so that more suspension particles will be discharged with the result that the ratio between the particles and the water in the discharge chamber increases and thus increasing the viscosity of the liquid therein. The result of this condition is that a greater amount of liquid is discharged by the cyclonic discharge apparatus 15 and thus the upward current is decreased. In this manner, a larger range of specific gravity changes can be met.

As shown in Figures 8 and 9, modifications of the invention may be made by varying the diameter of the inlet or outlet opening of the cyclonic discharge apparatus 15 while keeping the quantity of liquid fed into the discharge chamber constant. In Figure 8 the diameter of the inlet opening of the cyclonic discharge apparatus 15 may be varied by a flexible iris type valve 32 which is operated by air pressure as previously described. In Figure 9 the air operated flexible iris valve 33 is placed on the axial discharge opening of the cyclonic discharge apparatus 15 and also may be operated as previously described. Further, the above conditions relative to Figures 8 and 9 may be varied by varying the quantity of liquid fed into the discharge chamber of discharge tank 11.

As shown in Figure 5, another modification of our invention is to provide a flexible iris valve 34 between the separator A and the discharge tank 11, which has a cyclonic discharge apparatus 15 connected thereto. By keeping the quantity of water flowing into the discharge chamber of discharge tank 11 constant, the specific gravity in the separation zone is controlled by varying the diameter of iris valve 34 dependent on the variation of the specific gravity in the separation zone. Of course, the cyclonic discharge apparatus 15 will aid in the control of the specific gravity in the separation zone as previously explained.

In instances where the amount of water fed into the discharge chamber of discharge tank 11 must be varied dependent on the specific gravity of the separation zone, we have found, as shown in Figure 6 that an advantageous way for controlling the quantity of water is to provide the water inlet tube 12' with an iris valve 35. The iris valve 35 may consist of a cylindrical part of rubber or other suitable flexible material and may be controlled by varying the air pressure applied thereto.

Figure 7 shows a schematic view of a system for separating a suspension wherein the water supplied to the discharge chamber or discharge tank 11 is varied. The water inlet to discharge tank 11 is provided with a valve 36 which can be varied in diameter pneumatically according to the differences in specific gravity in the separation zone by putting two pipes 37 and 38 in the separation zone and which open at different levels therein. Thus, when feeding compressed air through the pipes 37 and 38 from a manifold 39 at a rate where air is always bubbling out of these pipes into the bath, and when connecting the other ends of these pipes with the controlled mechanism 40 of an automatic air pressure reducing valve 41, the pressure difference at the two levels in the separation zone is kept constant and the pressure difference will then depend only on the specific gravity of the separation zone.

When the specific gravity increases, the pressure difference will also increase so that the air pressure, controlled by reducing valve 41, is also increased with the result that the diameter of the iris valve 36 decreases so that less water is fed into the discharge chamber. The result of this is that the upward current in the apex opening of the separator decreases and thus increasing the amount of suspension particles being discharged.

A gradual diminution in the separation zone will occur. In other words, a decrease of the pressure difference at both levels at which the air bubbling pipes open will decrease the pressure difference which controls the air pressure reducing valve. Consequently, the air pressure outside of the iris valve decreases so that more water is fed into the discharge chamber and the strength of the upward current becomes higher, and less suspension particles are discharged which results in an increase of specific gravity in the separation zone.

In the event the level of the liquid in the separator is constant, only one air bubbling pipe is needed, such as shown in Figure 1, because then it is only necessary to measure the pressure difference between the level of the bath and the level at which the air bubbling pipe opens into the liquid.

It will be understood that variations from the above described procedure and apparatus are possible without departure from the invention. The terminology used in the specification is for the purpose of description and not for limitation, the scope of the invention being defined by the claims.

We claim:

1. In the separation of materials of different specific gravity and sizes utilizing a process of the type in which the materials to be separated are delivered into a substantially conical vessel containing an unstable suspension of fine heavy particles in a liquid wherein at least part of said particles are maintained in teeter in a separation zone by generating an upward current throughout said vessel and wherein discharge of the float of said zone together with overflowing liquid occurs from the top of the vessel and the sink of said zone occurs from the apex aperture of said vessel by reason of directing a stream of liquid at a variable velocity into said vessel through the apex aperture thereof to adjust the conditions of the suspension in said vessel, the improvement of varying the velocity of the variable stream of liquid in dependency on the specific gravity of the suspension in the separation zone by arranging the stream through the apex aperture to proceed into a discharge chamber into which a stream of surplus liquid is directed and from which a stream of liquid and sink materials continuously flows out, the process being characterized by arranging the stream of liquid and sink materials to flow out of the discharge chamber tangentially into a circular path from which path it is discharged axially to create an outflow resistance which changes in dependency with changes in the specific gravity in the separation zone to assist the action of the variable input stream of surplus liquid.

2. In the separation of materials of different specific gravity and sizes utilizing a process of the type in which the materials to be separated are delivered into a substantially conical vessel containing an unstable suspension of fine heavy particles in a liquid wherein at least part of said particles are maintained in teeter in a separation zone by generating an upward current throughout said vessel and wherein discharge of the float of said zone together with overflowing liquid occurs from the top of the vessel and the sink of said zone occurs from the apex aperture of said vessel by reason of directing a stream of liquid at a variable velocity into said vessel through the apex aperture thereof to adjust the conditions of the suspension in said vessel, the improvement of varying the velocity of the variable stream of liquid in dependency on the specific gravity of the suspension in the separation zone by arranging the stream through the apex aperture to proceed into a discharge chamber into which a stream of surplus liquid is directed and from which a stream of liquid and sink materials continuously flows out, the variable stream of liquid directed into the vessel through the apex aperture being adjusted by varying the surplus liquid entering the discharge chamber, the process being characterized by arranging the stream of liquid and sink materials to flow out of the discharge chamber tangentially into a circular path from which path it is discharged axially to create an outflow resistance which changes in dependency with changes in the specific gravity in the separation zone to assist the action of the variable input stream of surplus liquid.

3. Apparatus of the type described comprising an inverted substantially conical tank, means for feeding an adjustable stream of liquid into the tank through the apex aperture thereof, means for measuring the specific gravity in a separation zone, means for adjusting said stream of liquid in dependency of the specific gravity of the suspension measured in the separation zone, a discharge chamber communicating with the apex opening and provided with an open inlet and an open outlet, means for directing a stream of surplus liquid through said inlet opening, means for adjusting the ratio between the amounts of surplus liquid entering the discharge chamber and leaving the outlet of the discharge chamber, the outlet being connected with the tangential inlet of a cyclonic chamber provided with at least one axial outlet.

4. Apparatus of the type described comprising an inverted substantially conical tank having an apex aperture at the lower end and a separation zone at the upper end, a discharge chamber communicating with the apex aperture, discharge means for discharging liquid from the chamber, means for introducing a stream of surplus liquid into the discharge chamber for providing a stream of liquid upwardly through the apex aperture, means for measuring the specific gravity of the liquid in the separation zone, means for adjusting the velocity of the upwardly flowing stream, said adjusting means being controlled by the specific gravity measuring means to provide decreasing flow with increasing specific gravity in the separation zone and vice versa, the discharge means being a cyclonic apparatus so arranged that the tangential inlet of the cyclonic apparatus communicates with the said discharge chamber, with the final discharge of the apparatus being through an axial outlet of the cyclonic apparatus.

5. Apparatus as in claim 3, wherein the stream of liquid fed through the apex aperture is controlled by restricting the flow through the cyclonic chamber, the amount of liquid introduced into the discharge chamber remaining constant and the apex aperture remaining constant.

6. Apparatus as in claim 3, wherein a valve is provided in the means for directing the stream of surplus liquid through said inlet opening, and means to adjust said valve in dependency of the specific gravity of the suspension in the separation zone of the tank.

7. Process in accordance with claim 1, characterized in the fact, that the diameter of the apex aperture is adjusted in dependency of the specific gravity of the suspension in the separation zone.

8. Apparatus as in claim 3, provided with a valve at the apex aperture of the tank and means to adjust said valve in dependency of the specific gravity of the suspension in the separation zone of the tank.

WILLEM CHR. FOX.
JAN N. J. LEEMAN.

References Cited in the file of this patent

UNITED STATES PATENTS

| Number | Name | Date |
|---|---|---|
| 1,147,356 | Allen | July 20, 1915 |
| 1,895,505 | Wuensch | Jan. 31, 1933 |
| 1,900,190 | Menzies | Mar. 7, 1933 |
| 1,989,937 | Lessing | Feb. 5, 1935 |
| 2,105,126 | Pellet | Jan. 11, 1938 |